(12) United States Patent
Burke et al.

(10) Patent No.: US 7,424,670 B2
(45) Date of Patent: Sep. 9, 2008

(54) ANNOTATING DOCUMENTS IN A COLLABORATIVE APPLICATION WITH DATA IN DISPARATE INFORMATION SYSTEMS

(75) Inventors: Jonah S. Burke, Redmond, WA (US); Arshish C. Kapadia, Redmond, WA (US); Howard M. Crow, Redmond, WA (US); Jonathan A. Kauffman, Redmond, WA (US); Targo Tennisberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 331 days.

(21) Appl. No.: 11/223,505

(22) Filed: Sep. 9, 2005

(65) Prior Publication Data

US 2007/0061296 A1 Mar. 15, 2007

(51) Int. Cl.
*G06F 17/21* (2006.01)
*G06F 17/30* (2006.01)

(52) U.S. Cl. ...................................... 715/230; 707/102
(58) Field of Classification Search ................. 707/100, 707/102, 104.1, 3; 715/500, 512, 200, 230, 715/233
See application file for complete search history.

(56) References Cited

U.S. PATENT DOCUMENTS

| | | | |
|---|---|---|---|
| 5,649,105 A * | 7/1997 | Aldred et al. ............... 709/220 |
| 6,230,171 B1 | 5/2001 | Pacifici et al. ............... 707/512 |
| 6,438,580 B1 | 8/2002 | Mears et al. ................. 709/204 |
| 6,477,483 B1 * | 11/2002 | Scarlat et al. ............... 702/186 |
| 6,900,819 B2 | 5/2005 | Marshall et al. ............. 345/667 |
| 7,209,948 B2 * | 4/2007 | Srinivasa ..................... 709/204 |
| 2003/0018632 A1 | 1/2003 | Bays et al. ...................... 707/3 |
| 2004/0107249 A1 * | 6/2004 | Moser et al. ................. 709/204 |
| 2005/0132299 A1 * | 6/2005 | Jones et al. .................. 715/759 |
| 2006/0282762 A1 * | 12/2006 | Diamond et al. ............ 715/511 |
| 2007/0061295 A1 | 3/2007 | Burke et al. .................... 707/3 |

* cited by examiner

*Primary Examiner*—Cheryl Lewis (57) ABSTRACT

Systems and methods for annotating documents in provided in a collaborative application with data from disparate information systems are provided. The collaborative application enables the annotation of a document with data provided by another application. Particularly, the collaborative application enables a user to pick an item from a data store associated with another application. An association is established between the document and the picked item and retrieves data associated with the picked item from the data store. The document is annotated with the retrieved data. Because of the association, the collaborative application can determine that the picked item in the data store has been modified by the other application. The collaborative application may retrieve modified data associated with the picked item from the data store and update the annotation data associated with the document with the modified data.

12 Claims, 14 Drawing Sheets

ANNOTATING DOCUMENTS IN A COLLABORATIVE APPLICATION WITH DATA IN DISPARATE INFORMATION SYSTEMS

CROSS-REFERENCE TO RELATED APPLICATION(S)

This application is related to U.S. Non-provisional application No. Ser. 11/191,771, filed on Jul. 28, 2005, the content of which is hereby incorporated by reference.

BACKGROUND

Portal applications are gaining popularity as an effective means for people to share ideas and data. Conventional portal applications require shared documents to be saved onto the portals. If a user desires to share an existing document in the portal, the user typically has to manually save a copy of the document onto the shared storage. Furthermore, if the user wants to provide data about the document saved in the portal, the user generally has to manually enter the metadata in a page that includes a description of the document. This method of providing data about a document is a labor intensive process.

An effective solution for providing information about a document in a portal application without undue effort continues to elude those skilled in the art.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides systems and methods for annotating documents in provided in a collaborative application with data from disparate information systems. The collaborative application enables the annotation of a document with data provided by another application. Particularly, the collaborative application enables a user to pick an item from a data store associated with another application. An association is established between the document and the picked item and retrieves data associated with the picked item from the data store. The document is annotated with the retrieved data. If the picked item has been modified, the collaborative application may retrieve modified data associated with the picked item from the data store and update the annotation data associated with the document with the modified data.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
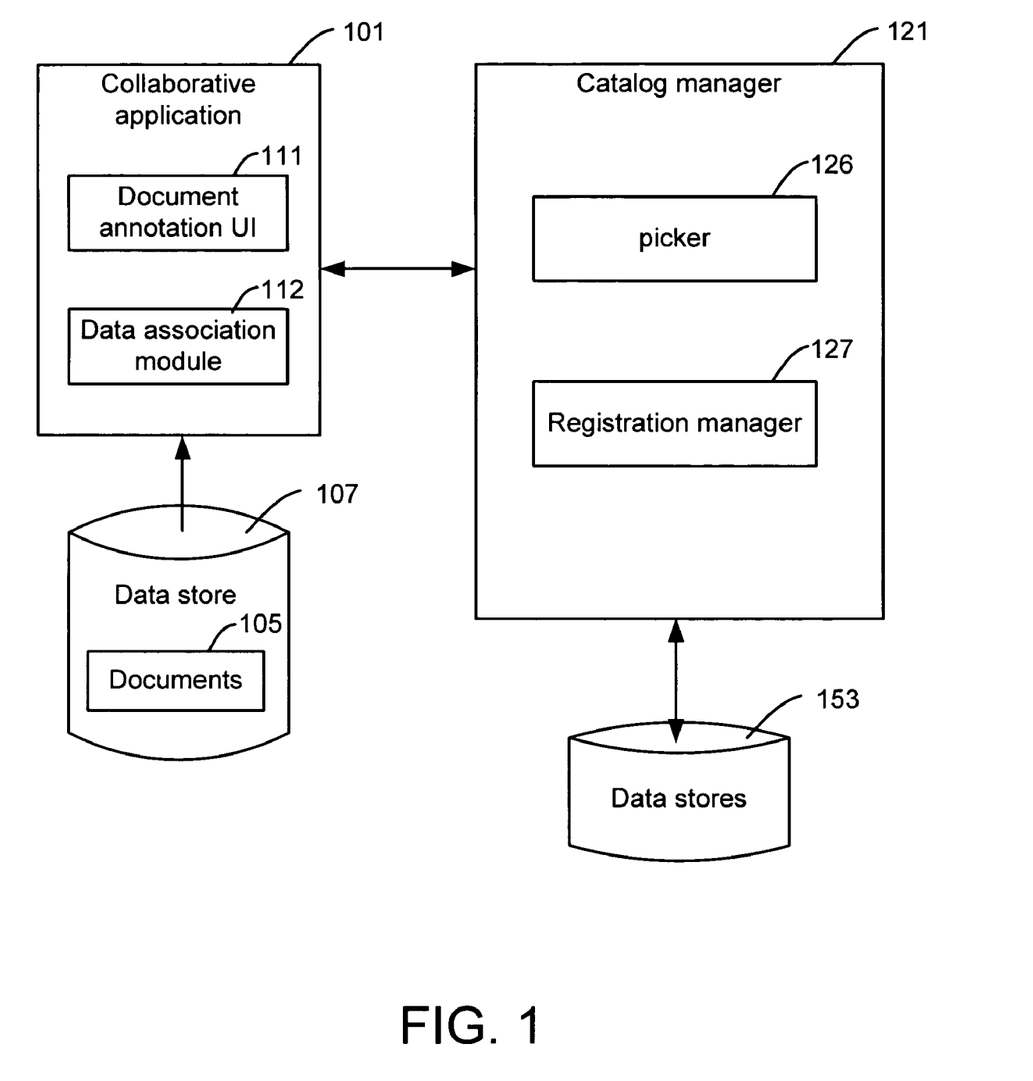
FIG. 1 shows an example system for enabling an application to pick data provided by difference types of data providers.

FIG. 1 shows an example system 100 for annotating documents in a collaborative application. Collaborative application 101 is an application that provides resources and services that are accessible by multiple users. Collaborative application 101 typically enables users to share information with each other by providing a central location where data can be accessed. Collaborative application 101 may include a web portal application, such as SHAREPOINT products and technologies provided by MICROSOFT®. Collaborative application 101 typically stores documents handled by the application in a data store 107. Collaborative application 101 is configured to share documents 105 saved in data store 107. Collaborative application 101 also enables documents 105 to be annotated with data. For example, collaborative application 101 provides document annotation user interface (UI) 111 that is configured to show data related to documents 105. Document annotation UI 111 is also configured to interact with picker 121 for selecting items that are provided by data stores 153. The items include the data for annotating documents 105. An example annotation user interface UI will be discussed below in conjunction with FIG. 5-12.

Data association module 112 is configured to associate documents 105 with the items selected for annotating documents 105. For a particular document, data association module 112 may be configured to create an association between the items picked with picker 121 and the document. Data associated with the picked item are displayed by document annotation UI 111. The document may be annotated with multiple values, such as title, bug ID, status, or the like. Because of the association between the picked item and the document, collaborative application 101 can retrieve updated version of the data associated with item from data stores 153 before displaying the data as annotation to the document. In this manner, the annotation data can be kept up to date, without manually saving the data in data store 107. Each document may be associated with multiple items and be annotated with multiple sets of data from different data stores 153.

Catalog manager 121 is configured to enable collaborative application 101 to use data from data stores 153. As shown in FIG. 1, Catalog manager 121 may include picker 126, and registration manager 127. Catalog manager 121 is configured to interact with data stores 153. Catalog manager 121 is configured to interact with data stores and to determine metadata associated with the data in data stores 153. The metadata may include any information about the data in data stores 153, such as data types, formats, or the like. The determined metadata may also identify and describe what items in data stores 153 are available for picking. The items can be any type of data in data stores 153, such as records, documents, files, and the like. Catalog manager 121 is configured to enable users to pick available items in data stores 153. Catalog manager 121 interacts with the users through document annotation UI 111.

Catalog manager 121 may include many different mechanisms for determining the items available for picking. For example, Catalog manager 121 may be configured to gather information about the data that are provided in data stores 153. Catalog manager 121 may also include registration manager 127 to handle metadata from data stores 153. Registration manager 127 is configured to enable data stores 153 to register with catalog manager 121. Data stores may identify items that are available for picking in the registration. Registration manager 127 is configured to maintain the list of data types and fields of each data type that are available at data stores 153. Registration manager 127 may also be configured to maintain information about the items that are available from each data store and to provide these items for picking. Catalog manager 121 is then configured to retrieve data associated with the picked items from data stores 153.

Catalog manager 121 is configured with various mechanisms for picking items from data stores 153. For example, Catalog manager 121 is configured to pick items with a key. This mechanism enables a user to pick data without browsing by simply entering a key in the picker UI. Catalog manager 121 may also be configured to retrieve a set of close matching items associated with the key where there are multiple items associated with the key. This mechanism allows a user to select a desired item from the set of returned items. For example, Catalog manager 121 may configure a picker UI to show a disambiguation menu in response to the user entering a non-unique key.

Catalog manager 121 is also configured to pass data retrieved from data store 153 through a set of filters. Catalog manager 121 can employ one or more of these filters to filter the retrieved data, such as by exact match, by wildcard, by range, by user, and the like. Filtering the results enables a user to pick from a set of relevant items associated with a search, without inundated the user with items that are not relevant to the search terms or the user.

The components and their configurations shown in FIG. 1 are shown as an example. In actual implementation, different components may be used to achieve the same functionalities. For example, in another implementation, the registration manager 127 may be a separate component from Catalog manager 121. Likewise, in alternative implementation, rather than a separate component, Catalog manager 121 may be incorporated into collaborative application 101. Also, data association module 112 may be incorporated in other modules, such as Catalog manager 121.

Figure 2:
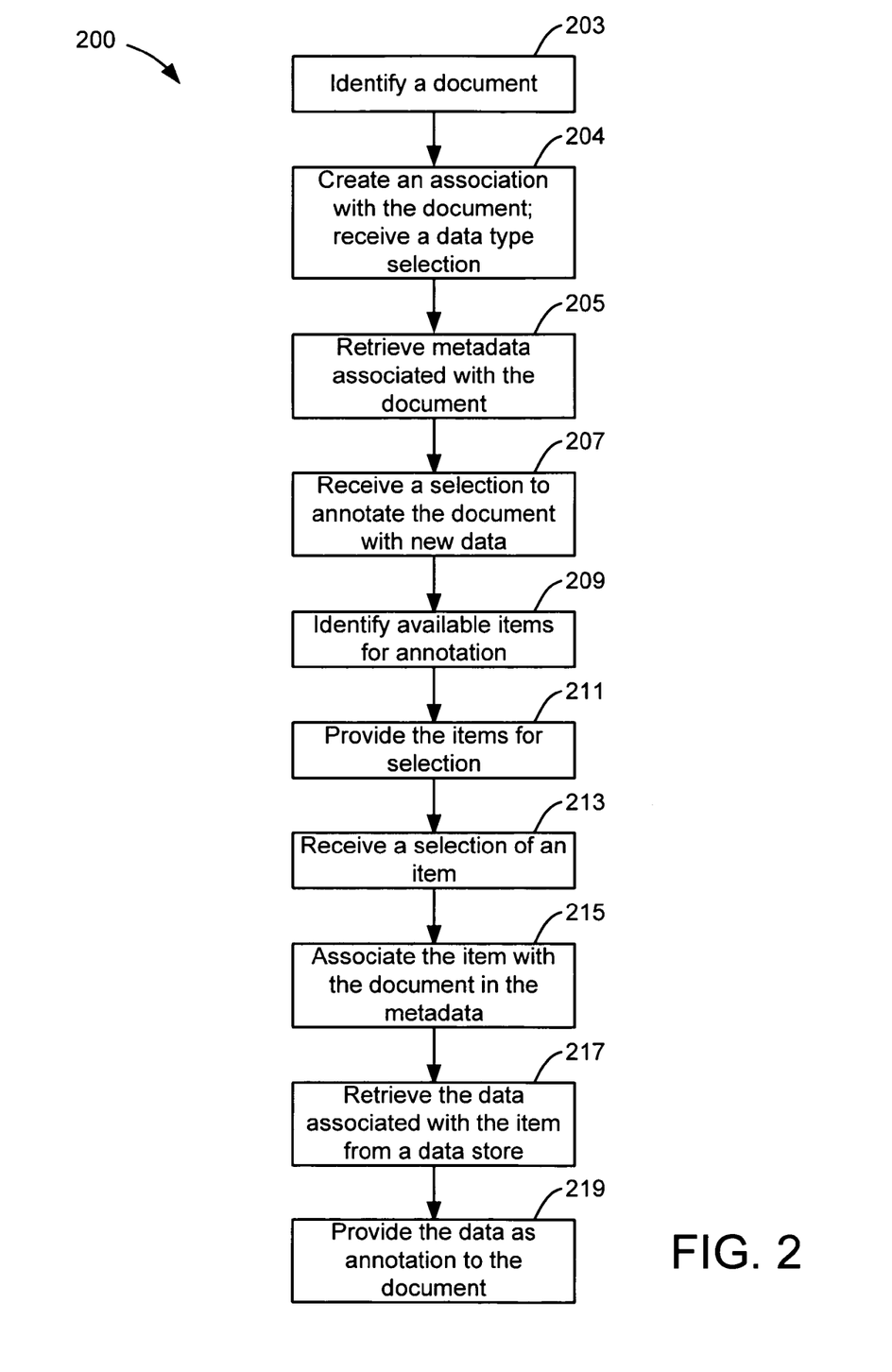
FIG. 2 shows an example process for annotating a document in a collaborative application with data from a data store associated with another application.

FIG. 2 shows an example process 200 for annotating a document in a collaborative application with data from a data store associated with another application. At block 203, a document associated with the collaborative application is identified. At block 204, an association is created with the document and a data type selection is received. The association enables annotation data to be associated with the document. The data type selection includes one or more types of data that are selected to annotate the document.

At block 205, metadata associated with the document is retrieved. At block 207, a selection to annotate the document with new data is received. At block 209, items available for annotation are identified. The items may be identified by an picker. At block 211, the items are provided for selection. At block 213, a selection of an item is received. Example processes for selecting items for annotation will be discussed in conjunction with FIGS. 3 and 4.

At block 215, the selected item is associated with the document as metadata. The association enables the metadata to be updated if the data in the data store associated with selected item is modified. For example, the document may be annotated with key values, such as identifiers, of the picked item. In this manner, the collaborative application does not need to actually store the data but to allow updates and "click-through" to a viewer page. At block 217, the data associated with the item from the data store is retrieved. At block 219, the data is provided as annotation to the document.

Figure 14:
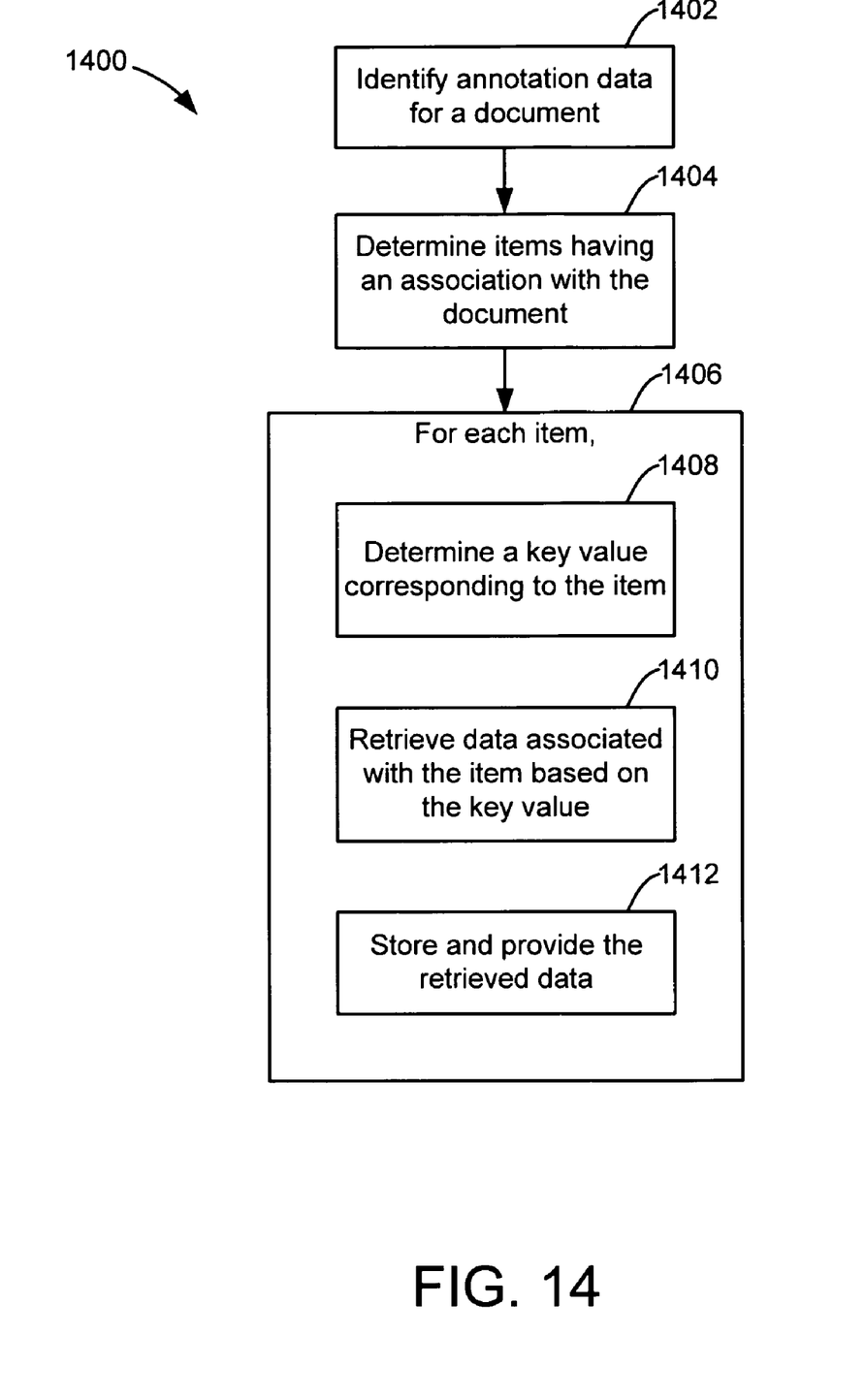
FIG. 14 shows an example process for updating annotation data for a document in a collaborative application.

FIG. 14 shows an example process 1400 for updating annotation data for a document in a collaborative application. At block 1400, the annotation data are identified. The annotation data may be in a variety of format, such as columns in a document view in the collaborative application. At block 1404, items of the annotation data having an association with the document are determined. For example, the items may be included in a column of the document view. At block 1406, each item is updated. In particular, at block 1408, a key value corresponding to an item is determined. The key value serves as an association between the item and corresponding data in the data store that provides the item. At block 1410, data associated with the item is retrieved based on the key value. The retrieved data is more up-to-date than the existing data. At block 1412, the retrieved data is stored and provided. For example, the data may replace the existing data in the columns.

Figure 3:
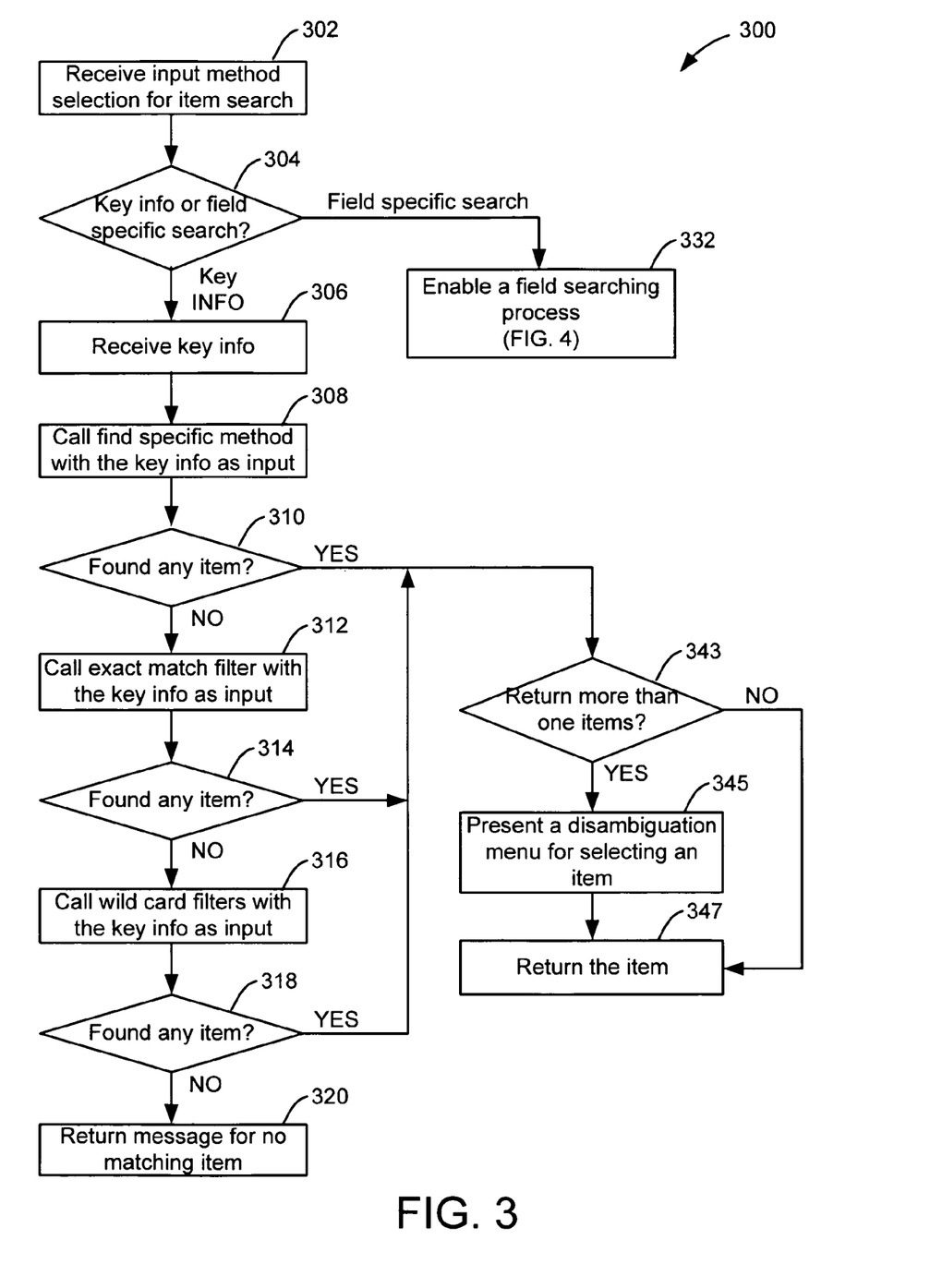
FIG. 3 shows an example process for enabling the adaptive picking of items associated with one or more data stores.

FIG. 3 shows an example process 300 for enabling the adaptive picking of items associated with one or more data stores. Process 300 may be implemented by a picker to enable users to pick items from any type of data stores.

At block 302, an input method selection for item search is received. At decision block 304, a determination is made whether the selected method is key information search or field specific search. If the selected method is field specific search, process 300 moves to block 332 where a field searching process is enabled. An example field searching process will be discussed below in conjunction with FIG. 4.

Returning to decision block 304, if the selected method is key information search, process 300 continues at block 306 where the key information is received. At block 308, a find specific method is called with the received key information as input. The find specific method enables the picker to determine an item in data stores that is identified by the key information. For example, the item may be a record that is identified by an identifier unique to that record. The find specific method may be implemented with a limited filter. At decision block 310, a determination is made whether any item is found by the find specific method. If so, process 300 moves to decision block 343.

Returning to block 310, if no item is found by the find specific method, process 300 goes to block 312 where an exact match filter is called with the key information as input. The exact match filter enables the picker to determine items that include a text string that exactly matches the text string provided in the key information. For example, items returned by the exact match filter may include a title that matches the key information. At decision block 314, a determination is made whether any item is found using the exact match filter. If so, process 300 moves to decision block 343.

Returning to block 314, if no item is found using the exact match filter, process 300 continues at block 316 where a wild card filter is called with the key information as the input. The wild card filter enables the picker to determine items with data that include a text string containing the text string provided in the key information. For example, the key information may match a portion of the title associated with the items returned by wild card filters. At decision block 318, a determination is made whether any item is found using the wild card filter. If so, process 300 moves to decision block 343. If no item is found, process goes to block 320 where a message for no matching item is returned.

At decision block 343, a determination is made whether more than one items are returned. If not, the process goes to block 347. If multiple items are returned, process 300 moves to block 345 where a disambiguation menu for selecting an item is presented. The disambiguation menu enables the user to select the exact item that is desired from among the multiple returned items. At block 347, the item selected by the process is retrieved from the data store and returned.

Figure 4:
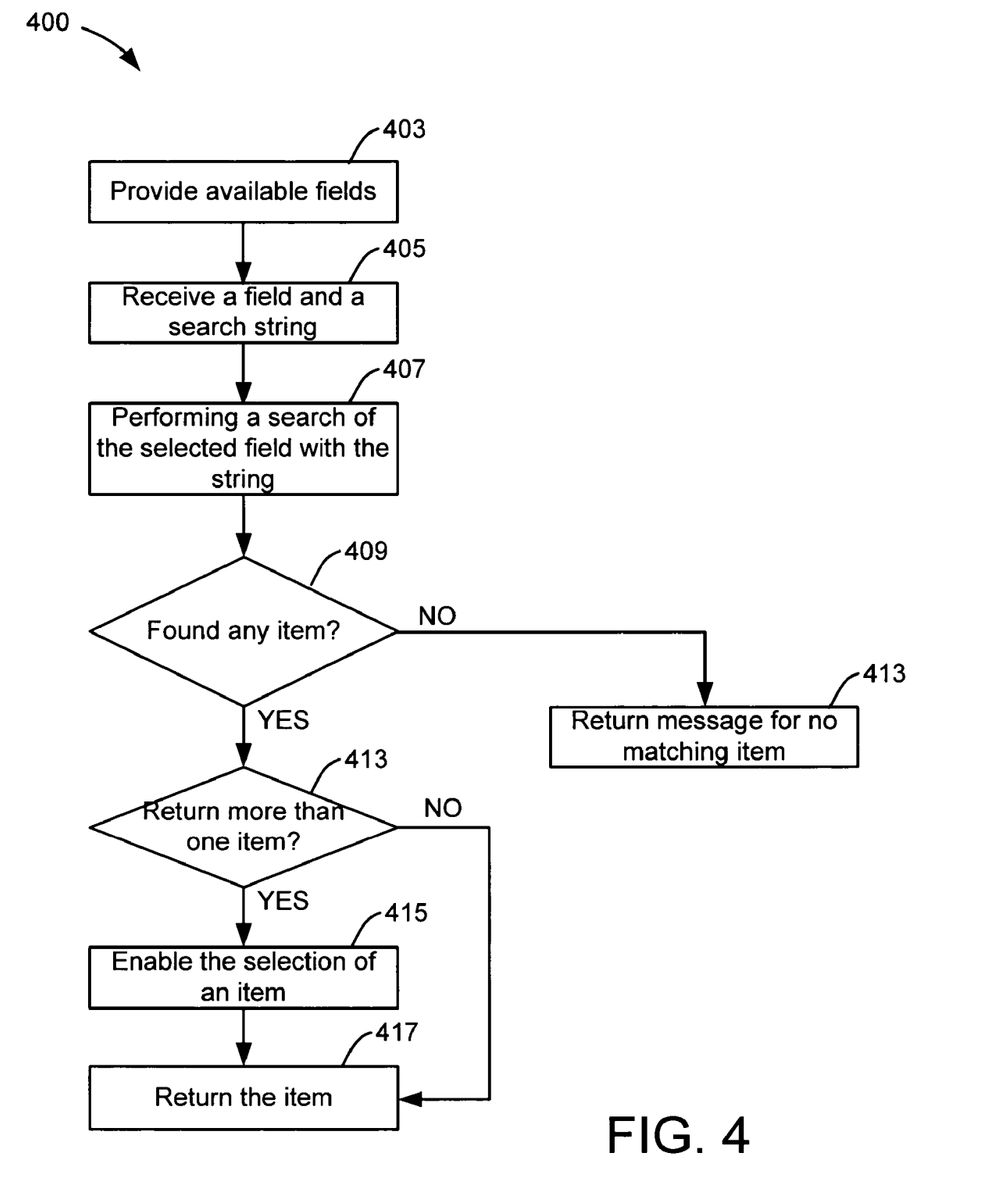
FIG. 4 shows an example process for selecting an item by field specific searching.

FIG. 4 shows an example process 400 for selecting an item by field specific searching. Process 400 may be implemented by an picker to enable users to pick items from data stores by specifying one or more fields and searching in the fields. At block 403, fields that are available for searching are provided. At block 405, a field and a search string are received. At block 407, a search of the selected field with the search string is performed. At decision block 409, a determination is made whether any item is found. If no item is found, process 400 moves to block 413 where a message for no matching item is returned.

Returning to decision block 409, if at least one item is found, process 400 moves to block 413 where a determination is made whether more than one items are found. If not, process 400 goes to block 417. If multiple items are found, process 400 goes to block 415 where the process enables a selection of an item from the multiple returned items. For example, a disambiguation menu may be presented to enable the selection. At block 417, the selected item is retrieved from the data store and returned.

Figure 5:
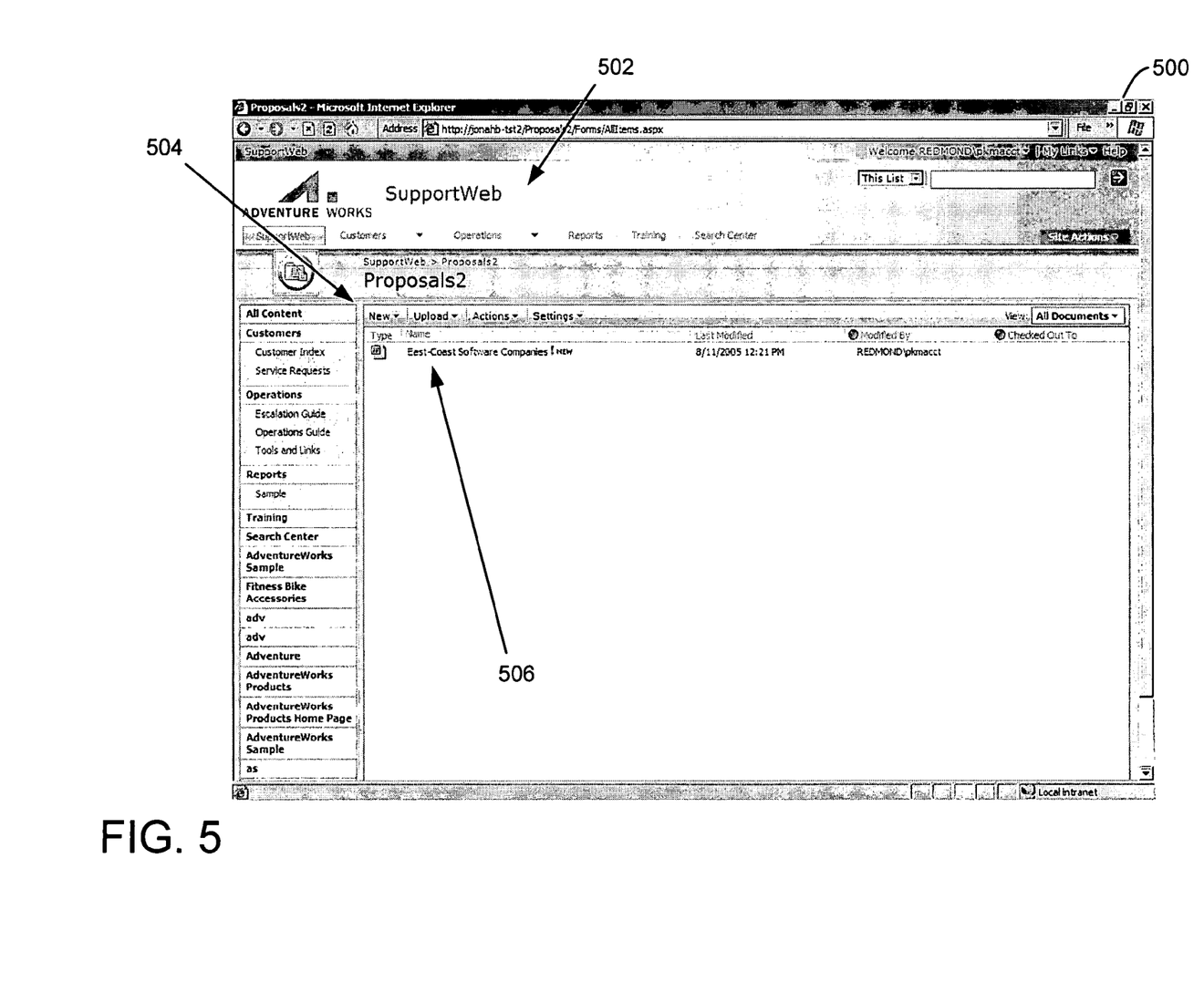
FIG. 5 shows a screenshot of an example user interface of a collaborative application that enables annotation of documents with data provided by another application.

FIG. 5 shows a screenshot 500 of an example user interface 502 of a collaborative application that enables annotation of documents with data provided by another application. In this example, the collaborative application includes document annotation user interface 504. The collaborative application enables metadata of documents provided by the collaborative application to be displayed. As shown in FIG. 5, a document about "East-Coast Software Company" is shown in document annotation UI 504. The displayed metadata 506 about the document includes the name of the document, the time it was last modified, the user who last modified the document, and the user to which the document is currently checked out. Each field of the metadata is organized as a column in document annotation UI 504.

Figure 6:
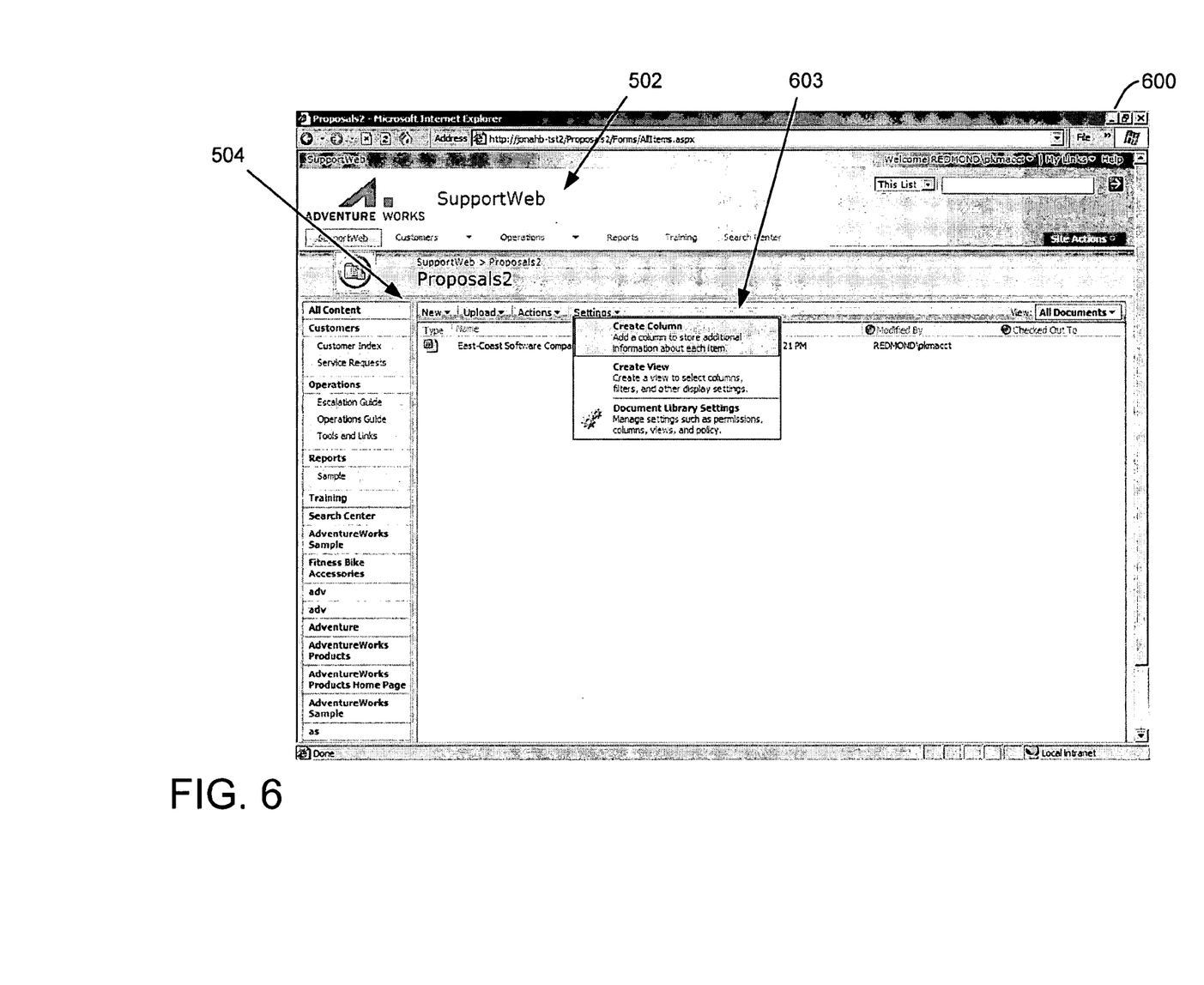
FIG. 6 shows another screenshot of the example user interface shown in FIG. 5.

FIG. 6 shows another screenshot 600 of the example user interface 502 shown in FIG. 5. In this screenshot, a selection is made to modify document annotation UI 504. In particular, a menu 603 has been activated and the create column action has been selected.

Figure 7:
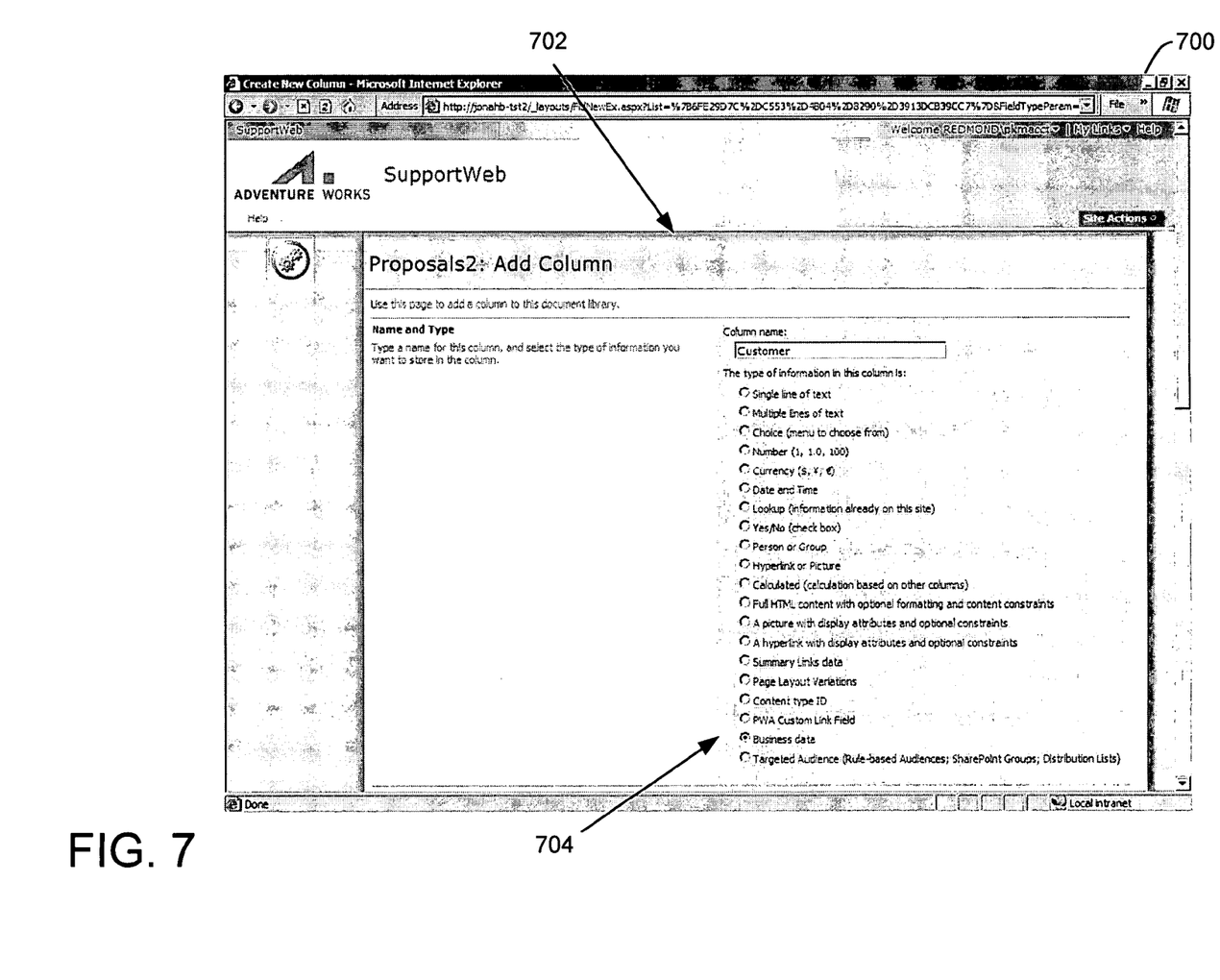
FIG. 7 shows a screenshot of an example user interface for adding a column to a document annotation UI.

FIG. 7 shows a screenshot 700 of an example user interface 702 for adding a column to document annotation UI 504. As shown in FIG. 7, a new column named "customer" has been added. Selector 704 for business data has been activated in UI 702. Business data include data that are provided by other applications. An item of business data can be annotated to the document in the collaborative application while still maintaining an association with the original data from the data store that provides the item.

Figure 8:
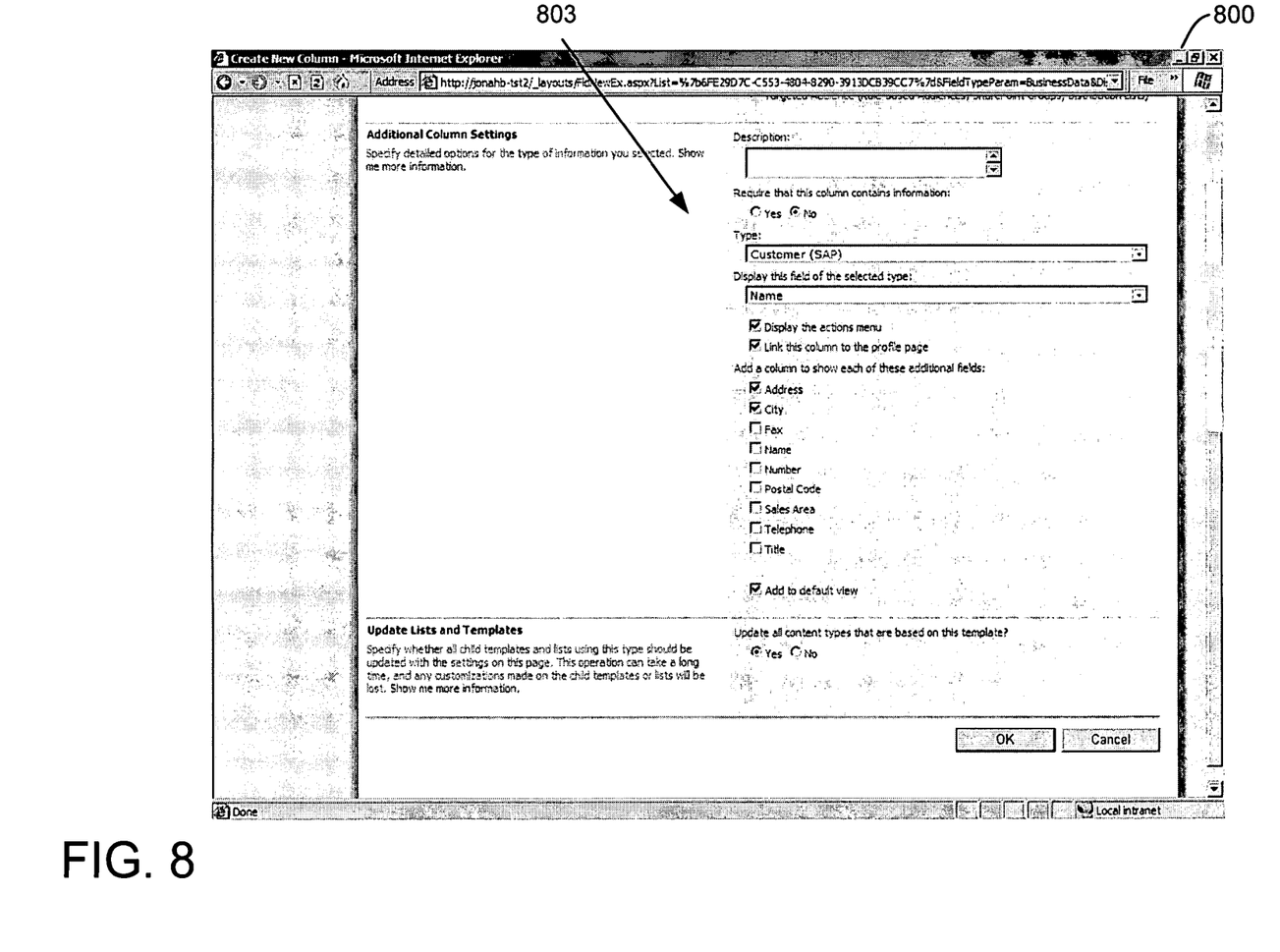
FIG. 8 shows a screenshot of an example user interface for configuring the setting of a newly added column for an annotation item.

FIG. 8 shows a screenshot 800 of an example user interface 803 for configuring the setting of a newly added column for an annotation item. Screenshot 800 illustrates that the newly added annotation item includes a "customer" type data. The field for the primary display is selected to be the "name" field. User interface 803 also enables other fields associated with the added annotation item to be displayed. As shown in FIG. 8, the address and city fields are selected.

Figure 9:
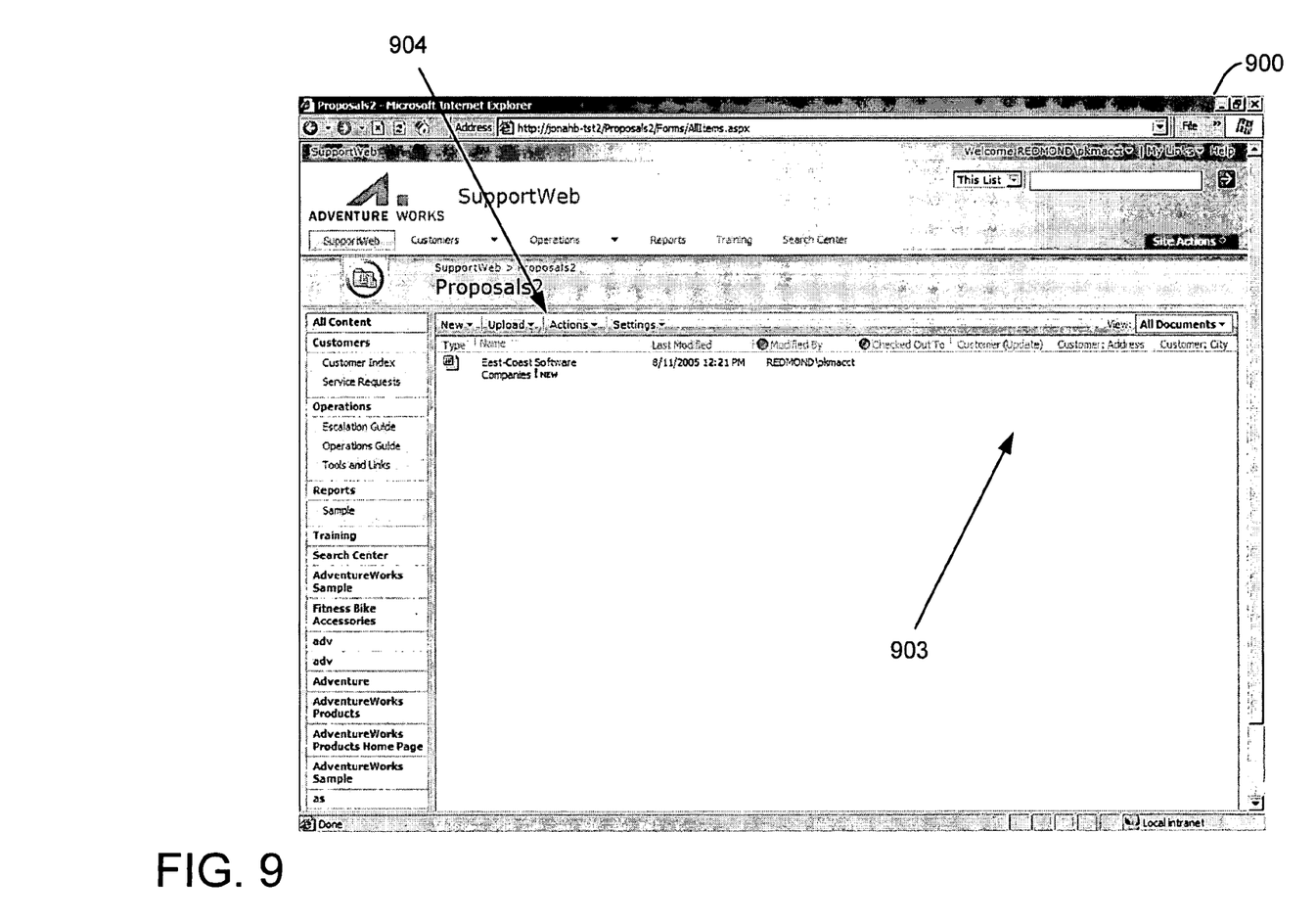
FIG. 9 shows a screenshot of a modified document annotation user interface.
Figure 10:
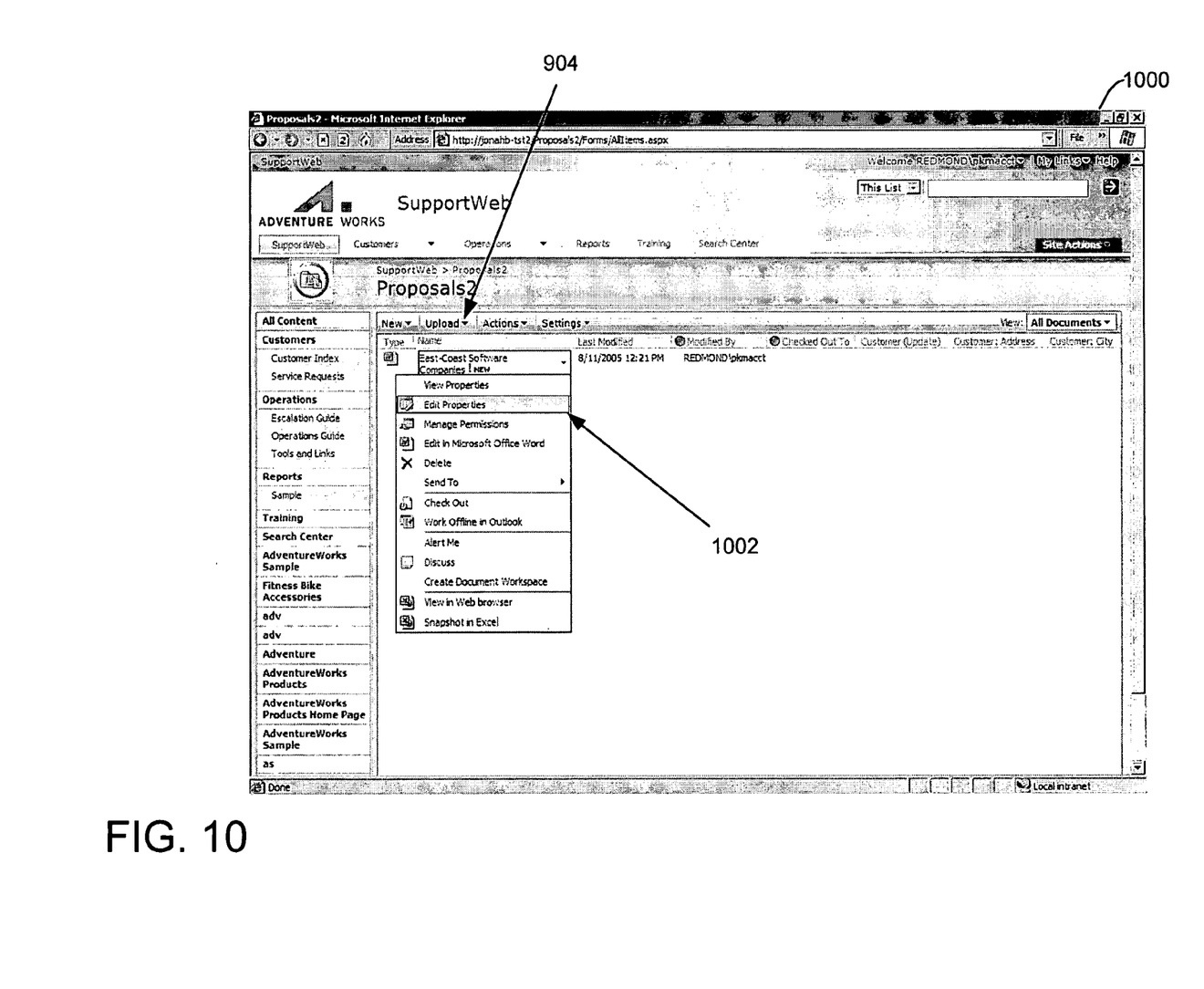
FIG. 10 shows another screenshot of the modified document annotation UI shown in FIG. 9.

FIG. 9 shows a screenshot 900 of a modified document annotation user interface 904. As shown in FIG. 9, document annotation UI 904 includes additional columns 903. FIG. 10 shows another screenshot 1000 of the modified document annotation UI 904 shown in FIG. 9. In screenshot 1000, a selection has been made to modify the display metadata (i.e. data in the columns) about the document.

Figure 11:
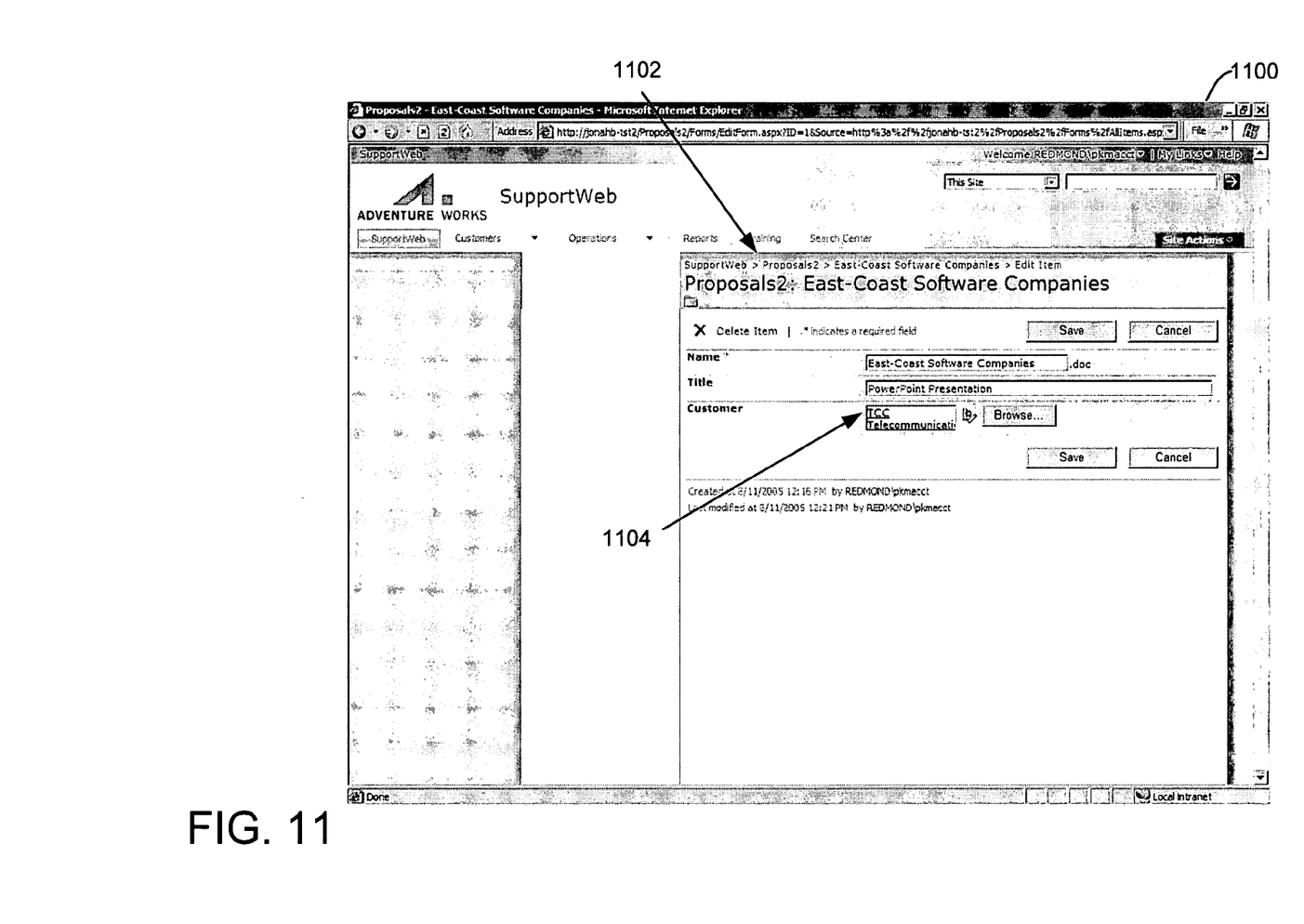
FIG. 11 shows a screenshot of a user interface for editing the annotation data for the document in the document annotation UI.

FIG. 11 shows a screenshot 1100 of a user interface 1102 for editing the annotation data for the document in the document annotation UI 904. As shown in FIG. 11, an item 1104 associated with a customer is selected and added to the annotation data. The item is provided by a data store associated with another application and is selected with an picker described above.

Figure 12:
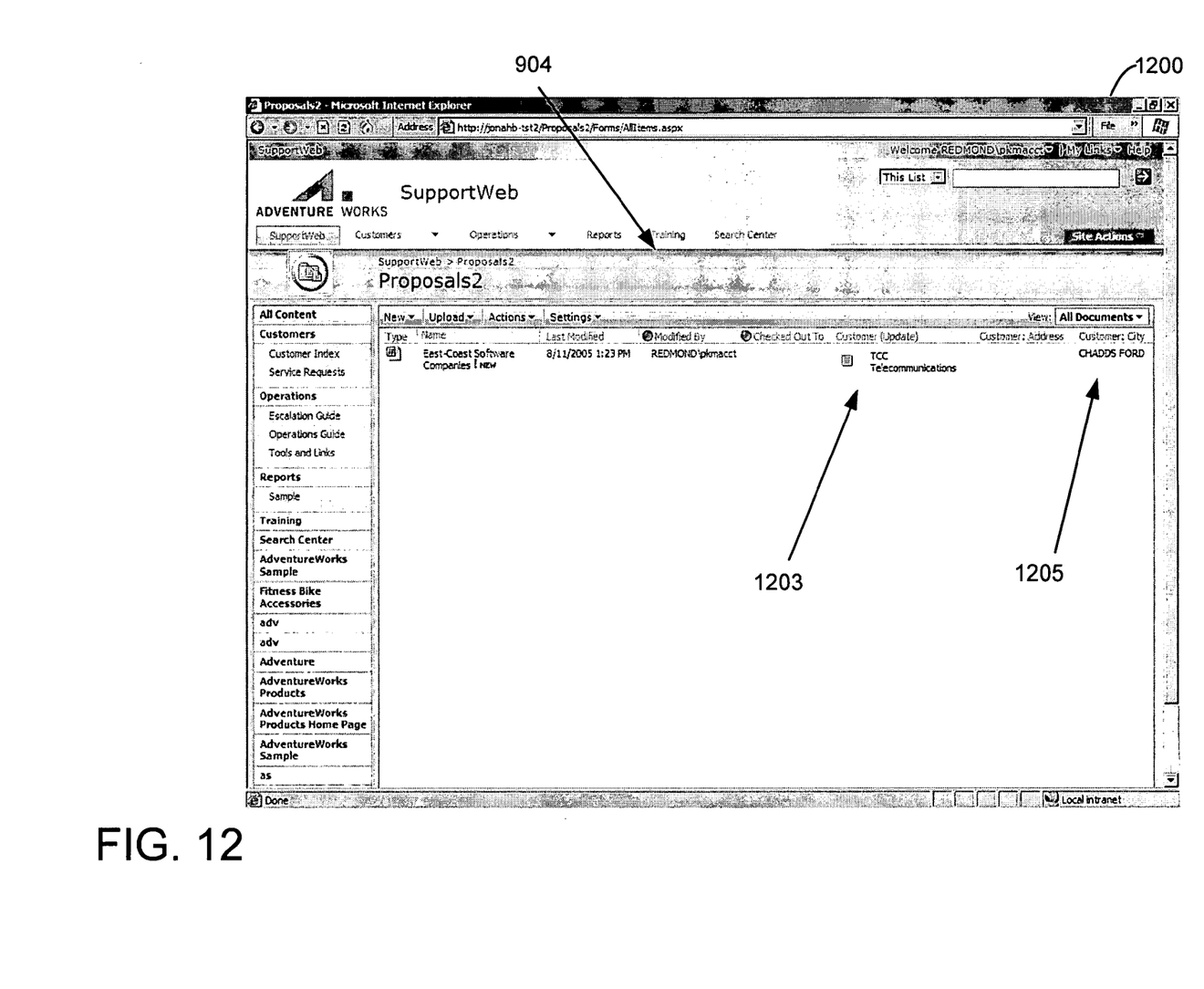
FIG. 12 shows a further screenshot of the modified document annotation UI shown in FIG. 9.

FIG. 12 shows a further screenshot 1200 of the modified document annotation UI 904 shown in FIG. 9. As shown in FIG. 12, a new item associated with a customer is displayed. Data from one or more fields of the item may be shown. In screenshot 900, the name 1203 and the address 1205 of the item are displayed.

Figure 13:
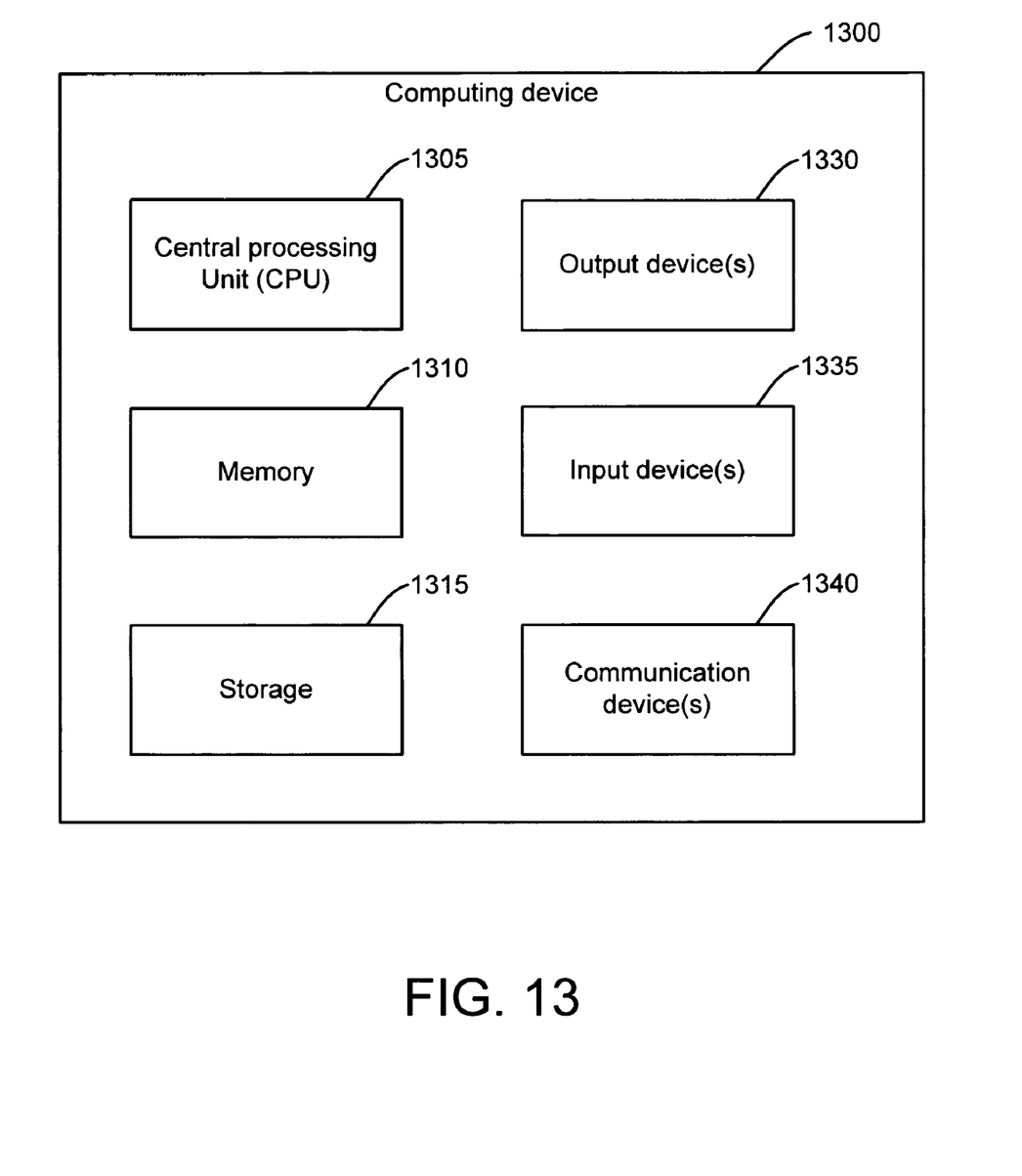
FIG. 13 shows an example computer device for implementing the described systems and methods.

FIG. 13 shows an example computer device 1300 for implementing the described systems and methods. In its most basic configuration, computing device 1300 typically includes at least one central processing unit (CPU) 1305 and memory 1310.

Depending on the exact configuration and type of computing device, memory 1310 may be volatile (such as RAM), non-volatile (such as ROM, flash memory, etc.) or some combination of the two. Additionally, computing device 1300 may also have additional features/functionality. For example, computing device 1300 may include multiple CPU's. The described methods may be executed in any manner by any processing unit in computing device 1300. For example, the described process may be executed by both multiple CPU's in parallel.

Computing device 1300 may also include additional storage (removable and/or non-removable) including, but not limited to, magnetic or optical disks or tape. Such additional storage is illustrated in FIG. 13 by storage 1315. Computer storage media includes volatile and nonvolatile, removable and non-removable media implemented in any method or technology for storage of information such as computer readable instructions, data structures, program modules or other data. Memory 1310 and storage 1315 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 1300. Any such computer storage media may be part of computing device 1300.

Computing device 1300 may also contain communications device(s) 1340 that allow the device to communicate with other devices. Communications device(s) 1340 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 1300 may also have input device(s) 1335 such as keyboard, mouse, pen, voice input device, touch input device, etc. Output device(s) 1330 such as a display, speakers, printer, etc. may also be included. All these devices are well know in the art and need not be discussed at length.

While the preferred embodiment of the invention has been illustrated and described, it will be appreciated that various changes can be made therein without departing from the spirit and scope of the invention.

The invention claimed is:

1. A computer readable storage medium having computer executable instructions that when executed cause a computer to:
    identify a document in a collaborative application;
    associate at least one data field native to the collaborative application with the document;
    select an item in a data store associated with an application separate from the collaborative application;
    associate the selected item with the document;
    in response to receiving a request for the document in the collaborative application;
    retrieve data associated with the selected item and data associated with the data field; and
    displaying the retrieved data on a user interface as an annotation without displaying the contents of the documents;
    wherein the item comprises a plurality of data fields;
    wherein the instructions to select an item further comprise instructions to:
        identify a plurality of fields associated with the selected item;
        receive a selection of at least one of the plurality of fields; and
        wherein the instructions to associate the selected item further comprises instructions to:
            associate the at least one of the plurality of fields with the documents.

2. The computer readable storage medium of claim 1 further comprising instructions to:
    store the retrieved data associated with the selected item.

3. The computer readable storage medium of claim 2 further comprising instructions to:
    retrieve modified data associated with the selected item form the data store; and
    update the user interface with the modified data.

4. The computer readable storage medium of claim 1 wherein each annotation is represented as a separate field associated with the document.

5. The computer readable storage medium of claim 1 wherein the collaborative application is a portal application.

6. A computer implemented method for a collaborative application to interact with a user, comprising:
    providing a user interface associated with the collaborative application;
    accessing a data store associated with a second application;
    receiving a selection of an item from the data store;
    retrieving at least a portion of data associated with the selected item from the data store; and
    displaying in the user interface data associated with a document as at least one annotation separate from the document, the data provided by the collaborative application, and displaying the data associated with the selected item as a separate annotation to the document in the user interface;
    displaying the annotation data associated with the document in a plurality of columns in the user interface, each column of the plurality of columns associated with a separate annotation;
    enabling additional annotation data to be added to the document;
    receiving a selection to add additional annotation data;
    in response to the selection to add additional annotation data;
        adding at least one new column to the plurality of columns; and
        displaying the additional annotation data in the at least one new column.

7. The method of claim 6 further comprising:
    identifying a plurality of fields associated with the selected item;
    enabling a selection of a set of fields from the plurality of fields;
    adding a new column to the plurality of columns for each field within the set of fields; and
    displaying data associated with each field in the new columns.

8. The method of claim 6 further comprising:
    determining if the selected item has been modified by the second application;
    retrieving modified data associated with the selected item from the data store; and
    displaying the modified data in the separate annotation to the document in the user interface.

9. The method of claim 6 wherein the collaborative application is a portal application.

10. A computer implemented system for annotating a document comprising:
    a collaborative application configured to provide resources and/or services that are accessible by multiple users;
    a collaborative application data store, the data store containing at least one document that is to be shared by the collaborative application;
    a picker configured to select items that are associated with at least one data store on an application separate from the collaborative application;

a data association module configured to associate items selected by the picker with a document in the collaborative application data store;

a document annotation user interface configured to show data associated with the at least one document in the collaborative application data store, and data associated with the items selected by the picker;

a user interface configured to display items that can be selected by the picker from the data store associated with the application separate from the collaborative application.

11. The system of claim 10 wherein the document annotation user interface displays data in a plurality of columns, each column is associated with a separate data entry of data associated with the document.

12. The system of claim 11 wherein the item comprises a plurality of data types, and wherein the picker is further configured to select at least a portion of the plurality of data types.

* * * * *